United States Patent
Sugden et al.

(10) Patent No.: US 6,192,666 B1
(45) Date of Patent: Feb. 27, 2001

(54) LAWN MOWER

(75) Inventors: David Sugden, Horicon; Kevin Boeck, Van Dyne; Todd R. Wanie, Horicon; James W. Hall, Princeton, all of WI (US)

(73) Assignee: Scag Power Equipment, Inc., Mayville, WI (US)

(*) Notice: Subject to any disclaimer, the term of this patent is extended or adjusted under 35 U.S.C. 154(b) by 0 days.

(21) Appl. No.: 09/265,742

(22) Filed: Mar. 10, 1999

(51) Int. Cl.[7] ............................. A01D 34/66; A01D 67/00
(52) U.S. Cl. ........................ 56/320.2; 56/16.9; 56/13.6; 56/17.5
(58) Field of Search ........................ 56/16.9, 320.2, 56/320.1, 6, 16.7, 17.5, 13.6

(56) References Cited

U.S. PATENT DOCUMENTS

| | | | |
|---|---|---|---|
| 3,696,595 | * 10/1972 | Dahl | 56/16.9 |
| 4,226,074 | 10/1980 | Mullet et al. | 56/320.2 |
| 4,258,539 | 3/1981 | Pearce et al. | 56/320.2 |
| 4,502,271 | * 3/1985 | Hansen et al. | 56/320.1 |
| 4,835,951 | 6/1989 | Walker | 56/16.6 |
| 4,881,362 | 11/1989 | Parker et al. | 56/202 |
| 4,916,887 | * 4/1990 | Mullet et al. | 56/320.2 |
| 5,035,108 | 7/1991 | Meyer et al. | |
| 5,070,683 | 12/1991 | Eggenmueller | 56/13.8 |
| 5,107,566 | 4/1992 | Schmid | 15/338 |
| 5,214,906 | * 6/1993 | Saki et al. | 56/320.2 |
| 5,267,429 | * 12/1993 | Kettler et al. | 56/320.2 |
| 5,305,589 | * 4/1994 | Rodriguez et al. | 56/320.1 |
| 5,465,564 | * 11/1995 | Koehn et al. | 56/320.2 |
| 5,826,416 | 10/1998 | Sugden et al. | 56/320.2 |
| 5,845,475 | * 12/1998 | Bushboom et al. | 56/320.1 |

FOREIGN PATENT DOCUMENTS 2 246 695   2/1992 (GB).

* cited by examiner

Primary Examiner—Thomas B. Will
Assistant Examiner—Meredith C. Petravick
(74) Attorney, Agent, or Firm—Michael Best & Friedrich LLP

(57) ABSTRACT

A lawnmower includes a cutter assembly having a cutter deck and at least three cutter blades disposed respectively in first, second and third cutting zones within the cutter deck. The cutter blades are coupled to a power source by a power transmission assembly. A first opening is formed in one side of the cutter deck adjacent the second cutting zone and a closure member is removably mounted on the cutter deck for closing the first opening. A second opening is formed in the cutter deck adjacent the second cutting zone and a conduit is coupled at one end to the second opening and at its other end to a hopper for conducting grass clippings from the cutter assembly to the hopper. A plurality of baffles define portions of the first, second and third cutting zones and are configured to direct clippings from the first cutting zone to the third cutting zone and from the third cutting zone to the second cutting zone. One of the baffles is configured to be mounted over the second opening and is removable to communicate the conduit with the second cutting zone.

22 Claims, 7 Drawing Sheets

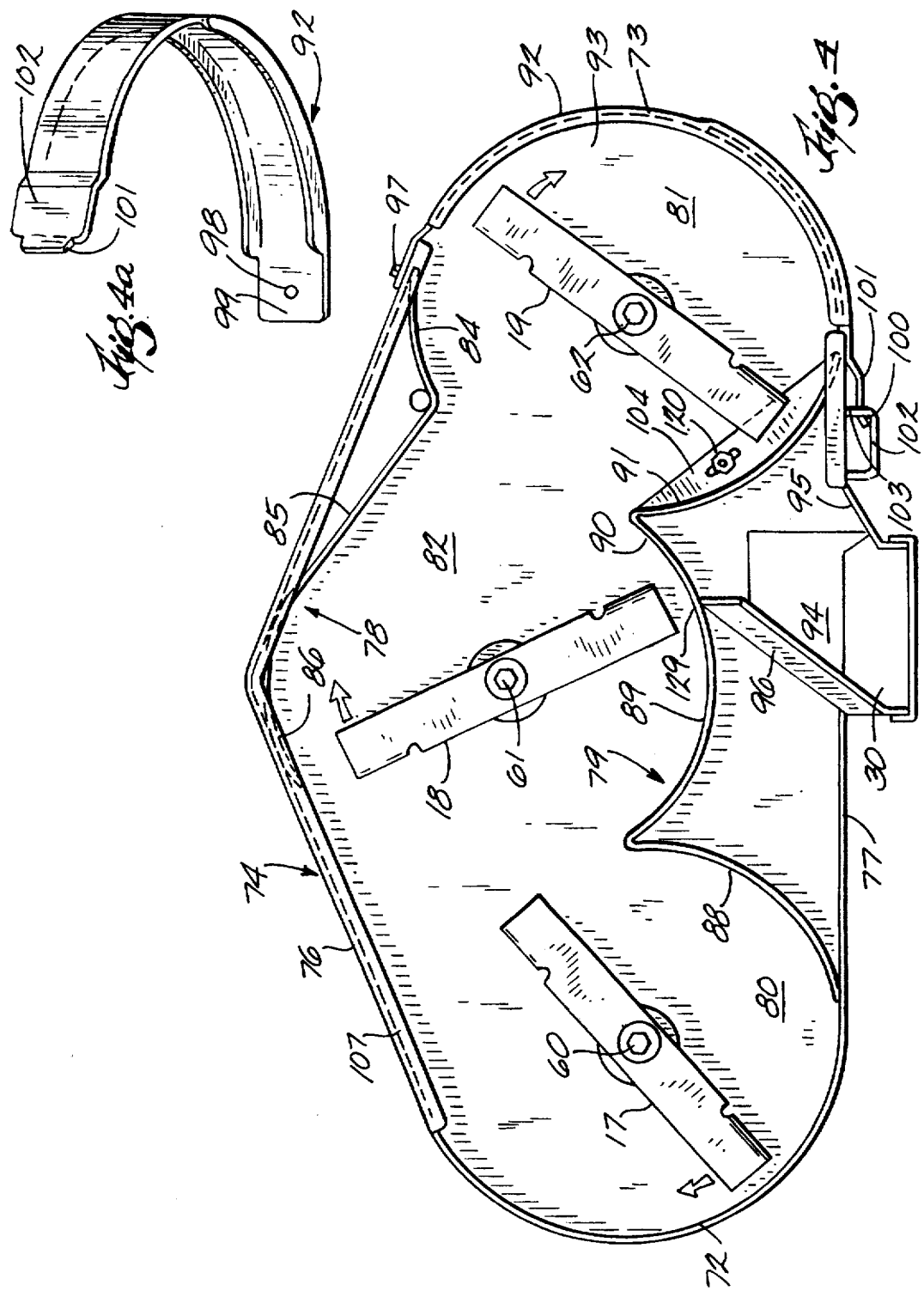

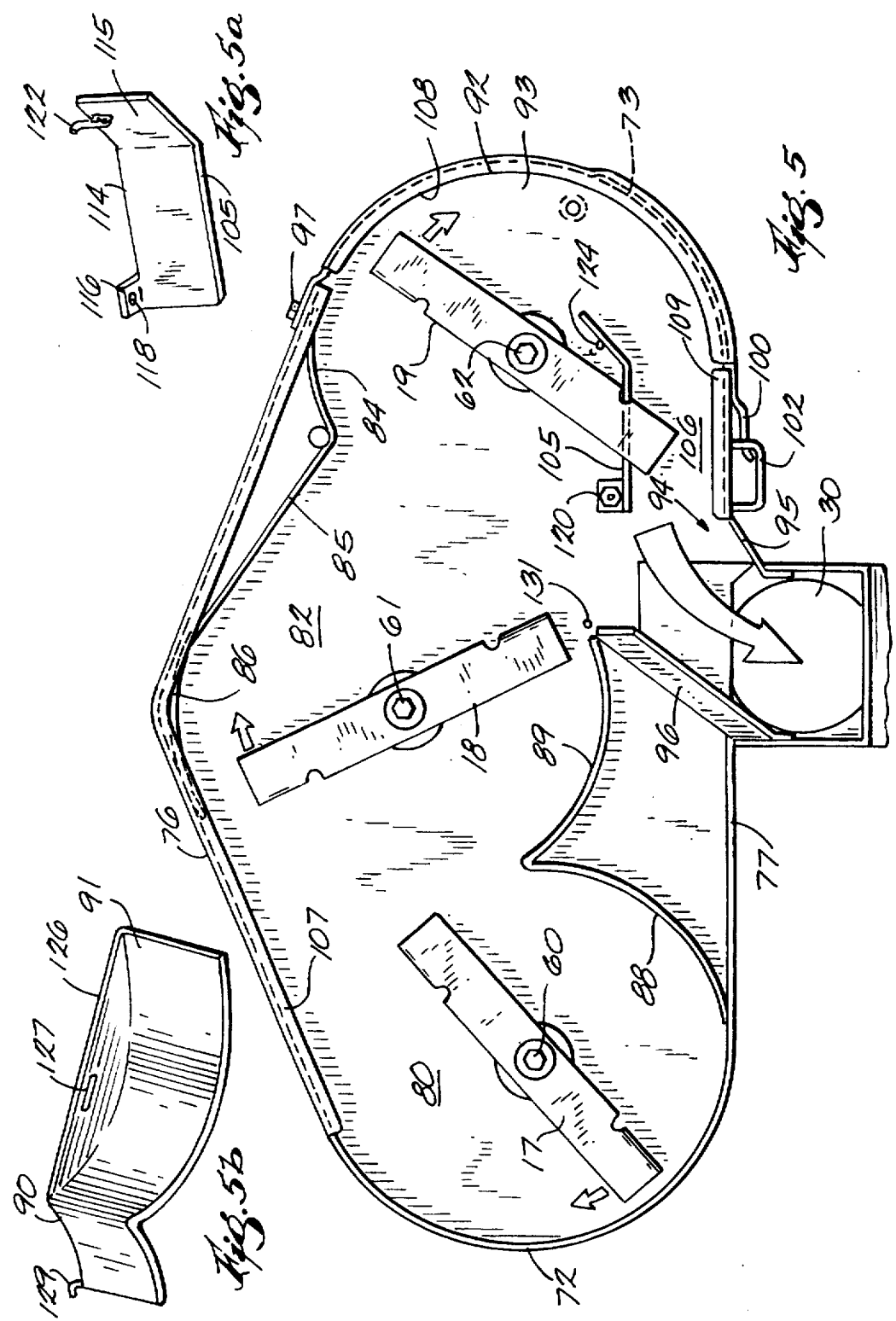

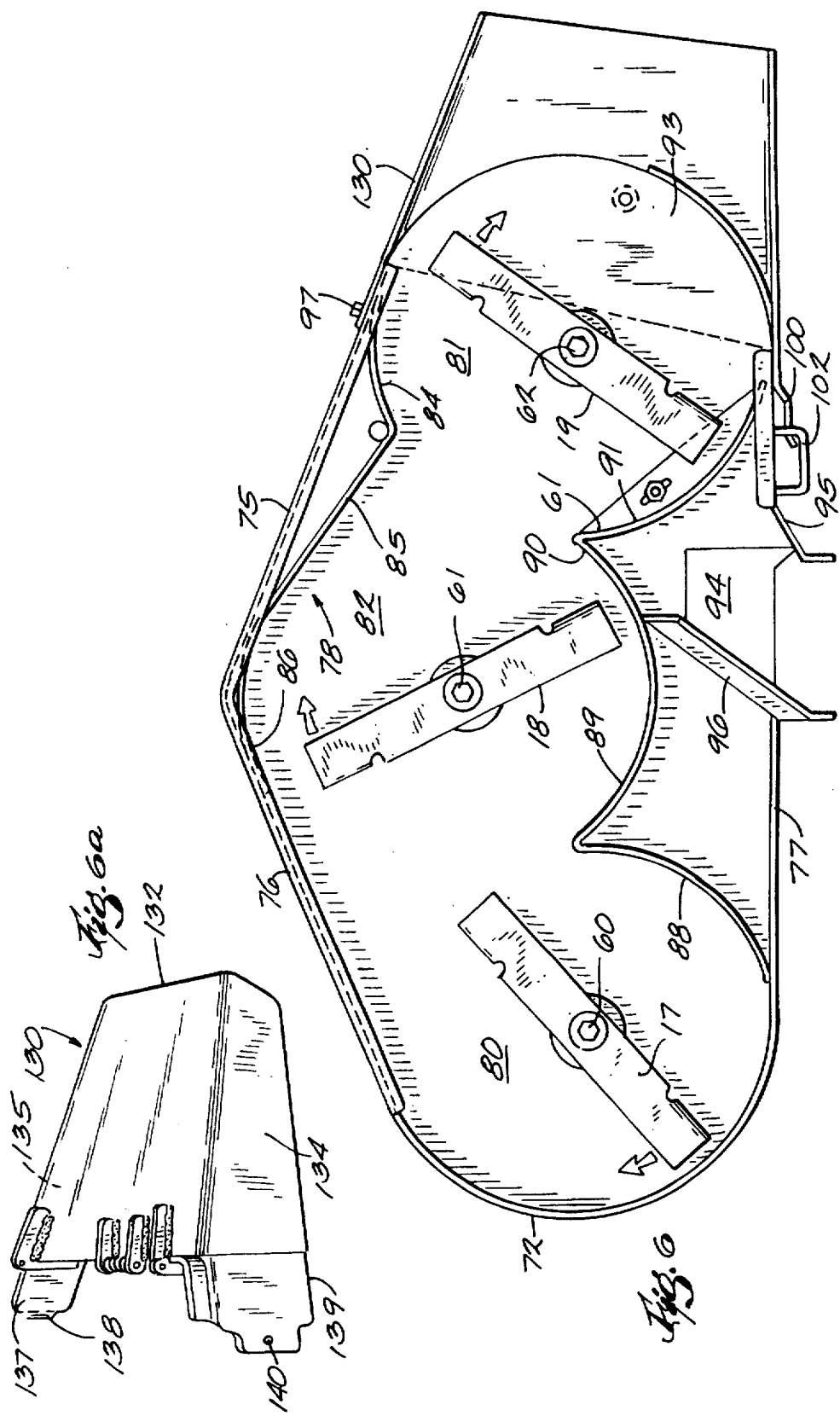

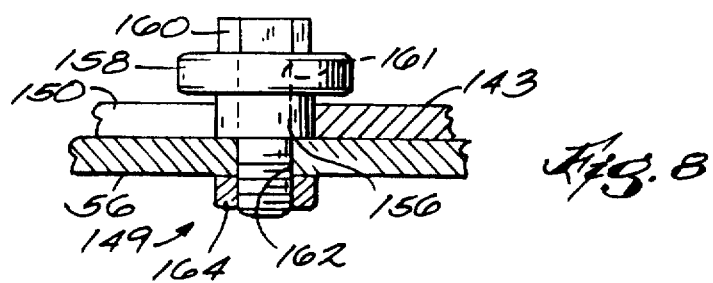
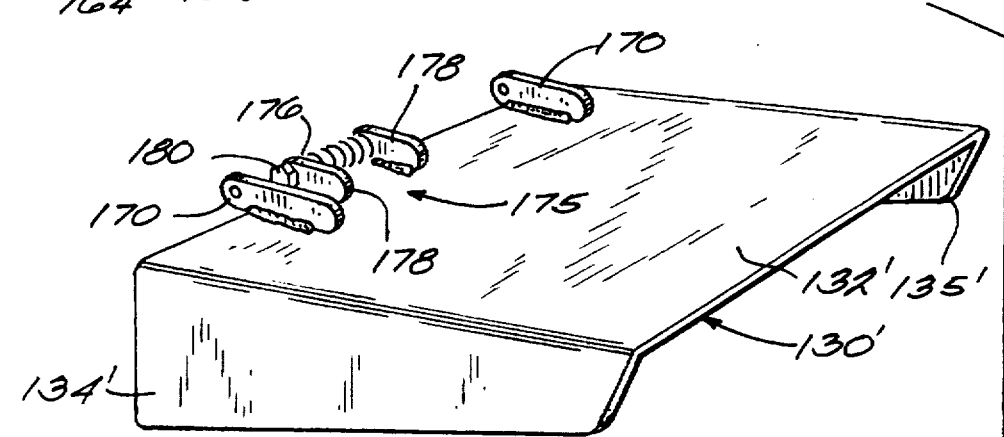
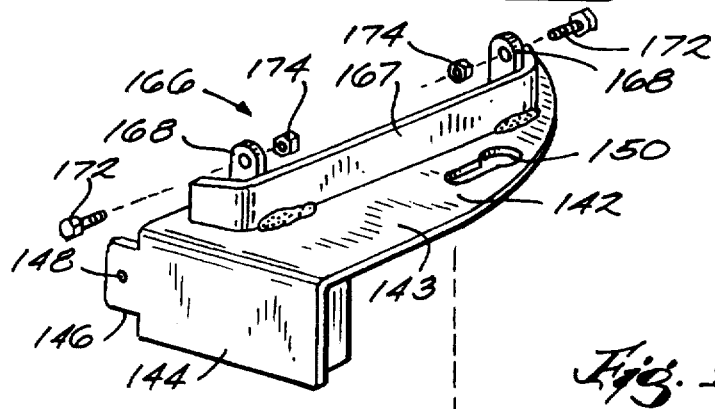
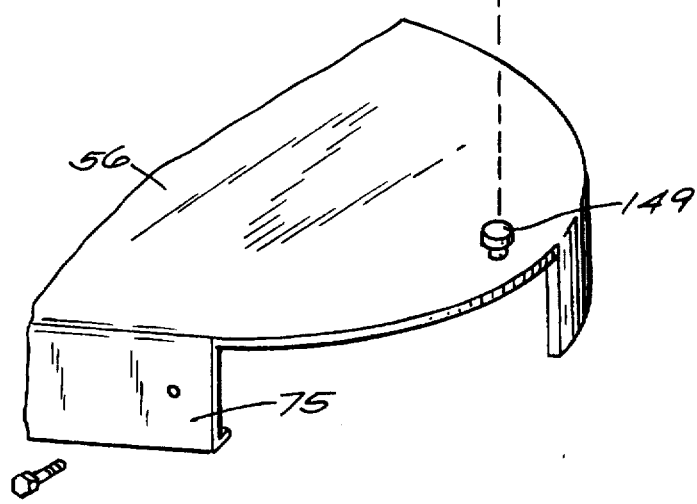

LAWN MOWER

BACKGROUND OF THE INVENTION

This invention relates to lawn mowers, and more particularly, a lawn mower cutter assembly.

Self propelled riding lawn mowers are well known in the art. Such mowers generally include a cutter assembly, an engine for driving the cutter assembly and the mower's drive wheels. Such riding mowers are also often provided with a conduit and blower assembly for conveying the clippings from the cutter assembly to a hopper. In some localities, the collection of grass clippings is prohibited because of limitations on dumping sites. As a result, grass clippings are not collected but are either mulched or discharged from a discharge opening which forms a part of the cutter deck.

In order to provide adequate cutting widths, commercial type lawn mowers are commonly provided with a plurality of cutter blades. One type of mower includes two cutter blades that rotate in opposite directions and discharge grass clippings through the center rear of the cutter deck. In order for the mower to execute a complete cut for each pass, it is necessary for the blades to be long enough to overlap in the center. This, in turn, requires that the blades be mechanically timed to prevent them from engaging. The usual method is to use a gear box for supporting rotating the individual blades. Gears control the timing of the blade rotation to prevent impact. Another method of controlling the blade rotation employs a cog belt and pulleys. In order to uncouple the cutter blade from the gear box or timing belt should the blade strike a heavy or immovable object such as a tree root, rock, pipe or the like, such mowers are commonly provided with shear bolts, which are intended to allow the blades to decouple from the gear box or drive system. In practice, shear bolts do not always work as intended. In such cases, the shock load is severe enough to damage the gear box resulting in an expensive repair. Even when the shear bolts do protect the gear box from damage, the shear bolts themselves must be replaced causing down time and inconvenience to the user.

One system which eliminates the requirement for overlapping blades is to use three cutters which are staggered as disclosed in U.S. Pat. No. 4,226,074. This permits the swath cut by the center blade to overlap those of the outer blades without the blades themselves overlapping. Such three-blade systems, however, are not wholly satisfactory because it is difficult to achieve both a center rear discharge for collecting clippings in a hopper and an optional side discharge when the clippings are not mulched or collected. The use of a center rear collection system insures that both sides of the cutter deck are clear to trim against walls, trees, fences and the like without requiring that the deck be wider than required. Prior art three-blade cutter systems generally employ a side discharge chute or a collection boot for delivering clippings to a catcher system. The side with the chute or boot typically extends ten to twelve inches from the end of the nearest cutter blade. This prevents grass from being cut in that area.

SUMMARY OF THE INVENTION

In general terms, the invention comprises a lawnmower including a cutter assembly having a cutter deck which defines at least three cutting zones and a cutter blade mounted in each cutting zone and rotatable about generally parallel axes. A power transmission assembly is coupled to a power source and the cutter blades for rotating the cutter blades. A first opening is formed in the cutter deck adjacent to the second cutting zone and a closure member is removably mounted over the first opening and configured to close the first opening. Baffles define portions of the first, second and third cutting zones, and additional baffles extend between the first and third cutting zones for directing clippings from the first cutting zone to the third cutting zone and between the third cutting zone and the second cutting zone for directing clippings from the third cutting zone to the second cutting zone. A second opening is formed in the cutter deck defining the second cutting zone and a conduit is coupled at one end to the second opening and its other to a Hopper for conducting grass clippings from the cutter deck to the Hopper. One of the baffles is positioned over the second opening and is removable to communicate the conduit with the second cutting zone.

According to another aspect, the invention comprises a lawnmower including a cutter assembly having a cutter deck defining at least three cutting zones and a cutter blade mounted in each cutting zone for rotation about generally parallel rotation axes. A power transmission assembly is coupled to a power source and the cutter blades for rotating the cutter blades about the rotation axes. A first opening is formed in the cutter deck adjacent the second cutting zone and a first removable member is mounted on the cutter deck for closing the first opening. A plurality of baffles define portions of the first, second and third cutting zones. The baffles are configured to direct clippings from the first cutting zone to the third cutting zone and from the third cutting zone to the second cutting zone. A second opening is formed in the cutter deck portion defining the second cutting zone and spaced from the first opening and a conduit is coupled at one end to the second opening and at its other end to a hopper for conducting grass clippings from the cutter deck to the hopper. A second removable member is constructed and arranged to be mounted over the second opening and is removable to communicate the conduit with the second cutting zone.

The invention provides a lawnmower in which the cutter blades define overlapping cutting swaths without requiring that the rotation of the blades be timed to prevent engagement of their tips. As a result, should the blades engage heavy or immoveable objects they are free to slip relative to a power transmission assembly without engaging or damaging adjacent blades. Moreover, the lawnmower according to the invention may be converted between mulching, side discharge or collection relatively rapidly.

BRIEF DESCRIPTION OF THE DRAWINGS

FIGS. 4, 5, and 6 illustrate the cutter deck and baffling assembly for various modes of operation;

FIGS. 4a, 5a, 5b and 6a are perspective views showing parts of the lawn mower of FIG. 1; and FIGS. 7 and 8 show an alternate embodiment of the invention.

DETAILED DESCRIPTION OF THE PREFERRED EMBODIMENT

Figure 1:
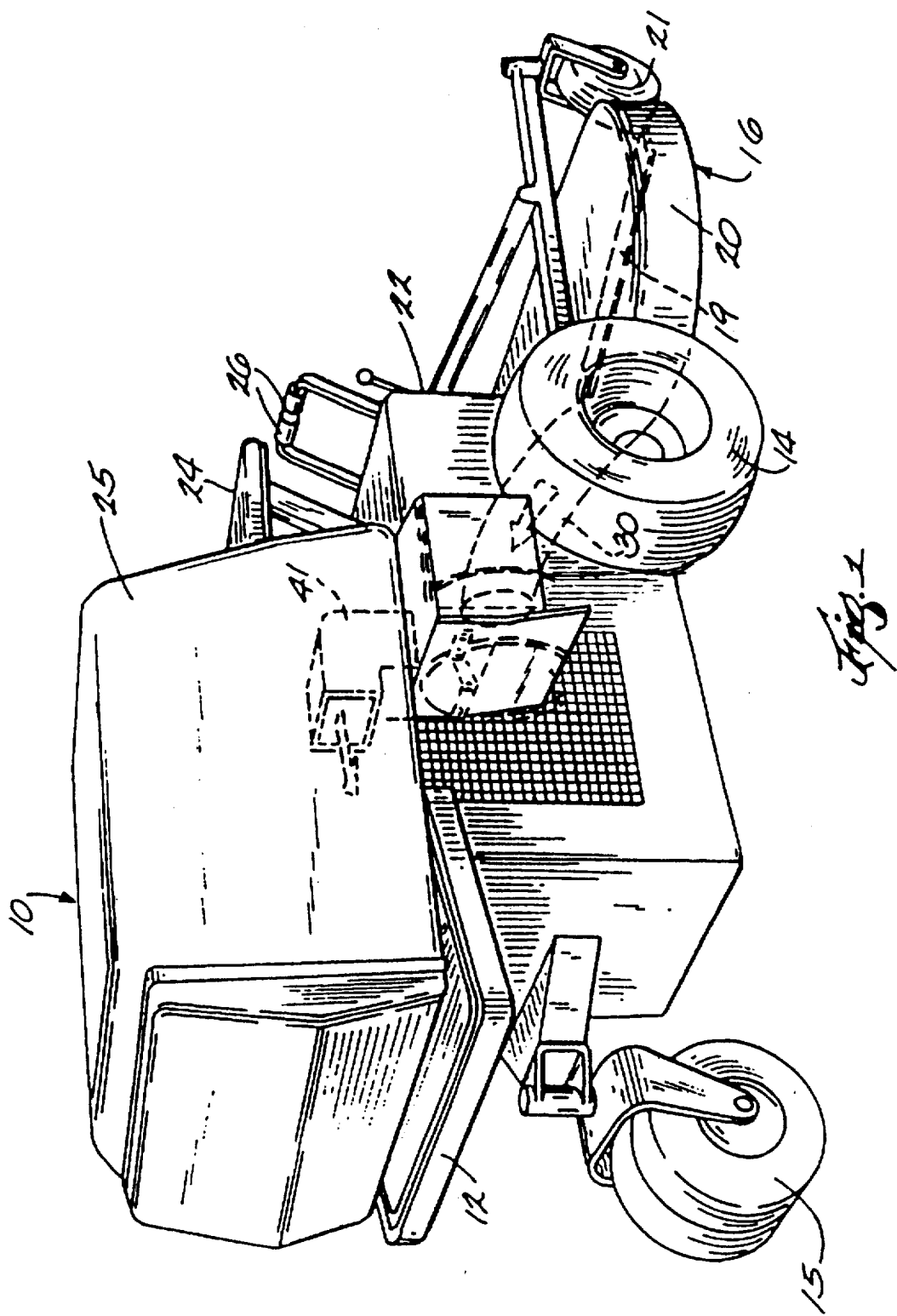
FIG. 1 is a perspective view showing the lawn mower incorporating the present invention.

FIG. 1 shows a mower 10 which incorporates a cutter assembly and a grass clippings discharge, mulching or collection system according to the invention. The mower 10 is otherwise conventional and, accordingly, will be described in general terms. In particular, the mower 10 includes a frame 12 which is supported at its front by a pair of drive wheels 14 and at its rear by a caster wheel 15. A cutter assembly 16 is mounted on the frame 12 forwardly of the drive wheels 14 and includes at least three cutter blades 17, 18 and 19 and a cutter deck 20 supported at its front end by casters 21. A hood 22 may be mounted on the frame 12 for enclosing an internal combustion engine and transmission (not shown) which comprises a power source for the drive wheels 14 and the cutter blades 17, 18 and 19 (FIG. 4). An operator seat 24 is mounted on the hood 22 and behind the operator seat there is a hopper 25 for collecting clippings from the cutter assembly 16 as will be discussed more fully below. The drive wheels 14 may be driven from the power source (not shown) in any conventional manners such as by a hydraulic system which independently drives each wheel 14. Steering may be accomplished by varying the rotational speed of each drive wheel 14 through the operation of levers 26 in a manner well known in the art.

Figure 2:
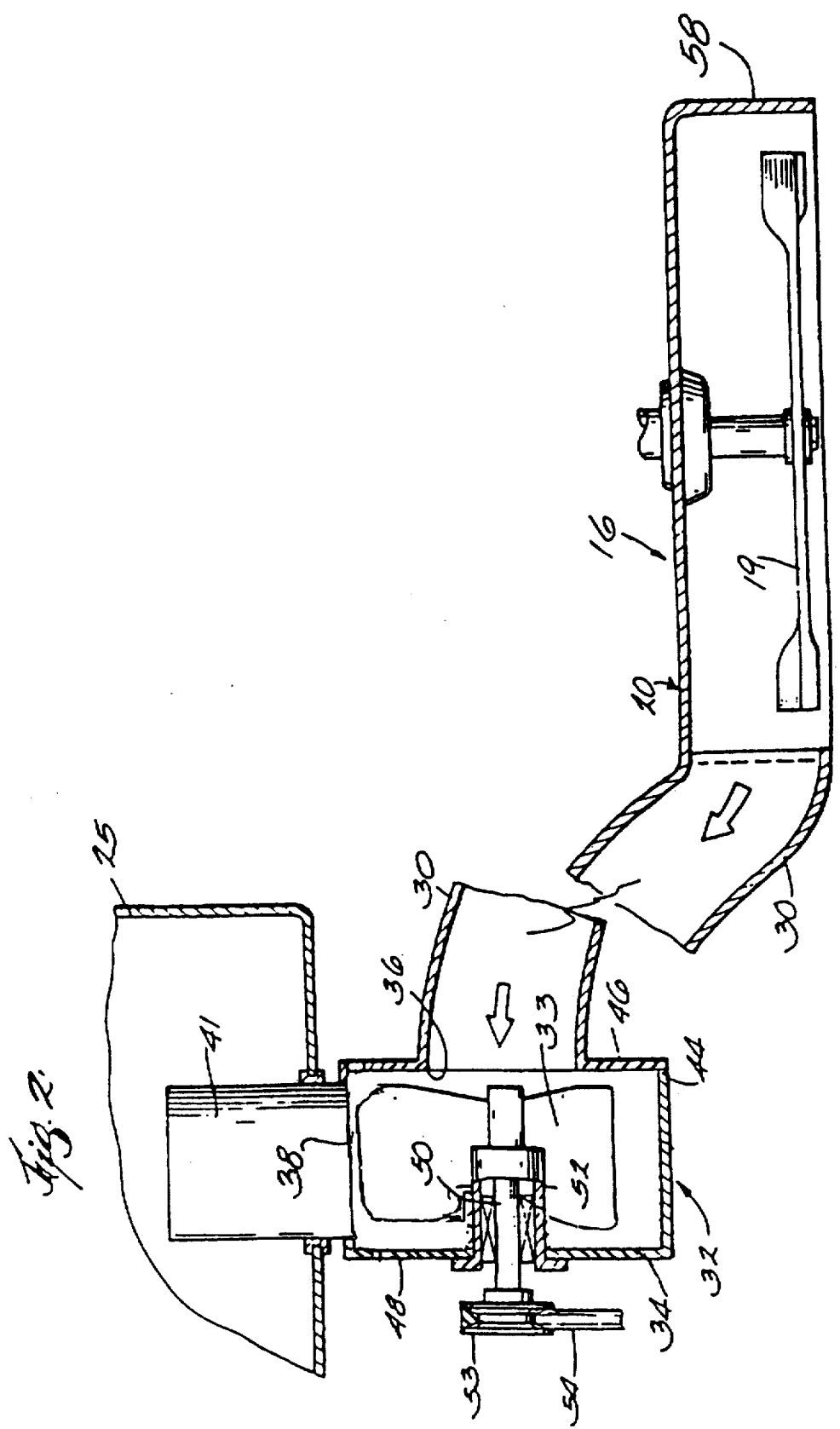
FIG. 2 is a side view, with parts broken away, of a portion of the lawn mower showing FIG. 1.

FIG. 2 schematically illustrates the grass clippings and collection system to include a conduit 30 which connects the cutter assembly 16 to a blower assembly 32 mounted below the hopper 25. The blower assembly 32 includes a fan 33 disposed within a fan housing 34 having an inlet 36 which communicates with the conduit 30 and an outlet 38. The outlet 38 in turn communicates with one end of the duct 41 whose other end opens into the hopper 25. The outlet duct 41 may be mounted for oscillatory movement under the action of an oscillating motor (not shown) for distributing the clippings more evenly within the hopper 25.

Housing 34 includes an arcuate outer wall 44 and a pair of circular side walls 46 and 48. The inlet 36 comprises a central opening in the side wall 46 and the outlet 38 comprises a peripheral opening in the outer wall 44 and which is connected to the duct 41.

The fan 33 includes the shaft 50 rotatably supported by a bearing 52 mounted on the side wall 48 and may be driven in any suitable manner, such as, by means of a pulley 53 mounted on shaft 50 and coupled to the power source (not shown) by a belt 54.

Figure 3:
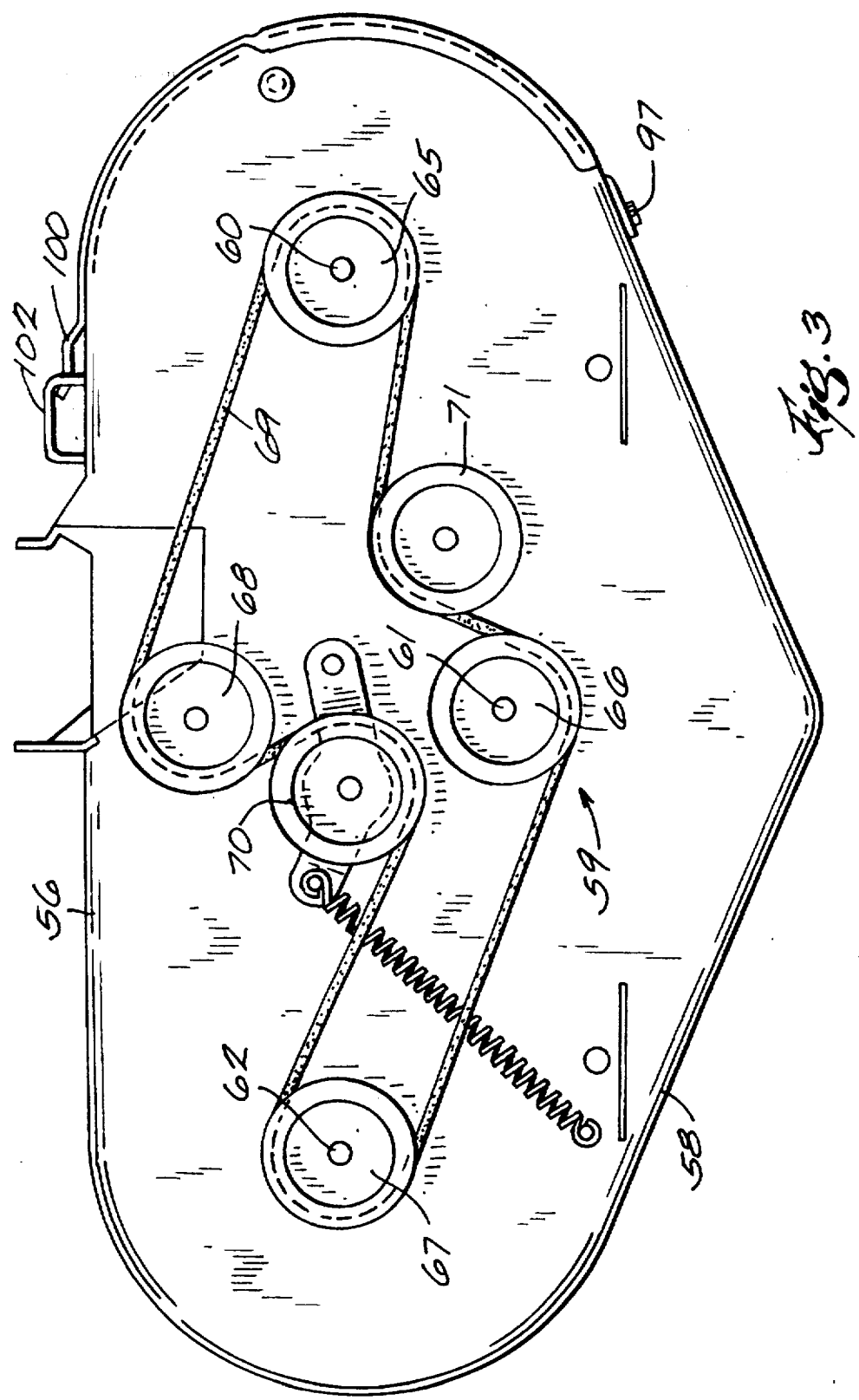
FIG. 3 is a top plan view of a portion of the lawn mower shown in FIG. 1 and illustrating cutter blade drive assembly.

The cutter deck 20 is shown in FIGS. 3–6 to include a top deck 56 and a skirt 58 which extends downwardly from the deck 56 in surrounding relation to the cutter blades 17, 18 and 19. A power transmission assembly is mounted on the top deck 56 for coupling the power source (not shown) to the cutter blades 17, 18 and 19. While any suitable mechanism may be provided for driving the cutter blades 17, 18 and 19, in the illustrated embodiment, a pulley and belt system 59 is employed as illustrated in FIG. 3. In particular, the power transmission assembly 59 includes spindles 60, 61 and 62 which are rotatably mounted in suitable bearings (not shown) mounted on the top deck 56. The spindles extend downwardly from the top deck 56 in a generally parallel relation. Cutter blades 17, 18 and 19 are fixed respectively to the lower ends of the spindles 60, 61 and 62 for rotation therewith. In addition, pulleys 65, 66 and 67 are mounted at the upper ends of spindles 60, 61 and 62, respectively. The pulleys 65, 66 and 67 are connected to the power source(not shown) by a drive pulley 68 and a belt 69 which extends around each pulley and around idler pulleys 70 and 71 for rotating the cutter blades in the direction indicated by arrows in FIG. 4.

The lengths of the cutter blades 17, 18 and 19 are sufficient to cut overlapping swaths. However, because the cutter blades are staggered, the ends of the blades themselves do not overlap so that timing of the blade position is not required. Should one of the cutter blades 17, 18 or 19 strike an immovable or heavy object, resistance is manifested by slippage between the belt 69 and the effected pulley 65, 66 or 67 without affecting the other blades or damaging the drive system.

As seen in FIGS. 4–6, the skirt 58 includes a pair of semi-circular side sections 72 and 73, a front section 74 defined by walls 75 and 76 which intersect at the front and are generally tangent to the forward edges of the side sections 72 and 73. In addition, there is a rear wall 77 whose ends are generally tangent to the rear ends of the side sections 72 and 73. FIGS. 4–6 also show a plurality of baffles for achieving mulching (FIG. 4) collection (FIG. 5) or side discharge (FIG. 6).

The side wall sections 72 and 73, the front section 74, a front baffle 78 and a rear baffle 79 define generally circular first, second and third cutting zones 80, 81 and 82 in which the cutter blades 17, 18 and 19, respectively, rotate. The baffles 78 and 79 direct clippings from the first and third cutting zones 80 and 82 to the second cutting zone 81 for rear discharge to conduit 30 as shown in FIG. 5 or for side discharges shown in FIG. 6.

The front baffle 78 and the rear baffle 79 are suitably fixed to the top deck 56 and each includes sections which define the cutting zones 80, 81 and 82. Specifically, the front baffle 78 includes a first relatively short arcuate section 84, a second longer generally linear section 85 and a third relatively short arcuate section 86. The rear baffle 79 includes arcuate sections 88, 89, 90 and 91 and linear sections 95 and 96. Baffle sections 90 and 91 are integrally formed and are removably mounted below the top deck 56 and the sections 88, 89, 95 and 96 are fixed. The first section 84 of the front baffle is generally tangent at one end to the front wall 76 and its other end extends to the second baffle section 85. The straight baffle section 85 extends between the second and third cutting zones 81 and 82. The opposite ends of the baffle section 86 are tangent to the baffle section 85 and the front wall 76 which in turn extends between the first cutting zone 80 and the third cutting zone 82.

The rear baffle section 88 is generally tangent to the side section 72 and its opposite end engages the baffle section 89. When rear baffle sections 90, 91 are mounted in the position as shown in FIG. 4, they extend to the baffle section 89 at one end and its opposite end is generally tangent to the side wall member 73. The baffle sections 88 and the side wall portion 72 define the first generally circular cutting zone 80. The front baffle sections 85 and 86, the rear baffle sections 89 and 90 define the third generally circular cutting zone 82. The front wall 76 is generally tangent to the side wall 72 and defines a transition between the cutting zones 80 and 82. The side wall 73, the rear baffle section 91, and the front baffle section 84 define the second cutting zone 81 and the baffle section 85 defines a transition section.

A closure member 92 is removably mounted on the cutter deck 20 to close an opening 93 as shown in FIG. 4. The rear wall 77 has a second opening 94 which communicates with the conduit 30 via linear baffles 95 and 96.

As shown in FIGS. 4 and 4a, closure member 92 attaches at one end to the front wall part 75 by a first mounting means or member, such as a bolt 97, or other releasable fastener, which extends through an opening 98 formed in an extension 99 of member 92 and a corresponding opening in front wall 75. The other end of member 92 attaches to the rear wall 77 by means of a tab 100 formed in an offset member 101 that engages a second mounting member fixed to the rear of wall 77. In the illustrated embodiment, the second mounting member comprises a bracket 102 fixed to the rear wall 77. The offset member 100 formed on the end of the member 92 engages a slot 103 formed in bracket 102 for attaching the rear end of member 92. When the baffle sections 90 and 91 and the member 92 are attached as shown in FIG. 4, openings 93 and 94 are closed and the mower is set up for a mulching mode with no outlets for the clippings. During mulching, the blower fan 33 is decoupled from the power source.

FIG. 5 shows the mower set up for rear discharge to the hopper 25. Here, the closure member 92 remains in position to close opening 93. However, baffle sections 90 and 91 are removed to expose rear opening 94 so that the second cutting zone 81 communicates with the conduit 30 through opening 94 and baffle parts 95 and 96. In addition, a baffle plate 105 is suspended below the top deck 56 and above blade 19 to define a passage 106 along the rear portion of the side wall 73 and the adjacent rear wall 77. In this mode, the rotation of the blades 17, 18 and 19 in a clockwise direction as shown in FIG. 5 tends to move the grass clippings from cutting zones 80 and 82 into cutting zone 81, against the closure member 92 into the gap 106 and toward the baffle 96. The suction created by the fan 33 draws the clippings into the conduit 30 as shown in FIG. 5.

In order to maintain the clippings in this flow path, the front wall section 76, the side wall 73 and the rear wall portion 77 opposite baffle plate 105 are provided with bottom flanges 107, 108, and 109, respectively.

FIGS. 5 and 5a show the baffle part 105 to include a first relatively long section 114 and a second relatively shorter section 115 formed at an obtuse angle to each other. A short flange 116 is provided at the free end of the section 114. A hole 118 formed in flange 116 permits the baffle part to be secured below the top deck 56 by a single third mounting means or members, which in the illustrated embodiment comprises bolt 120 or other releasable fastener. A finger 122 at the opposite end of baffle part 105 extends outwardly and upwardly for being received within an opening 124 in top deck 56 for fixing that end of the baffle part.

FIG. 5b shows the baffle sections 90, 91 to include a top flange 126 having a central slot 127 for receiving the bolt 120. This permits the baffle sections 90, 91 and the baffle part 105 selectively to be mounted using the same bolt 120. A finger 129 extending from the end of baffle section 90 is received within a hole 131 in the top deck 56 to secure the baffle sections 90, 91.

When it is desired to discharge the grass clippings from the side of the mower, the baffle member 105 is removed, the baffle sections 90, 91 are reattached to close opening 94 as shown in FIG. 6. In addition, the closure member 92 is removed to expose opening 93. Finally, a side discharge chute 130 is attached over opening 93. Again, the clockwise rotation of the cutter blades 17, 18 and 19 as shown in FIG. 6 projects clippings from the first and third cutting zones 80 and 82 toward the second cutting zone 81 and out of the opening 93.

The discharge chute 130 is shown in FIG. 6a to include a top plate 132 and a pair of side plates 134 and 135 extending generally perpendicularly downward from the top plate 132. At the rear end of the side plate 134 there is a rearwardly extending mounting member 137 having an offset portion 138 therein for engaging the bracket 102 which also mounts the closure member 92. There is also a mounting member 139 having a hole 140 engageable by the bolt 97. Thus the chute 130 mounts on the cutter deck 20 in the same manner as the closure member 92.

It will be appreciated that the mower can be converted from the mulching mode to the rear collection mode by the removal of the baffle sections 90, 91 and attachment of the baffle plate 105. This involves loosening and relatching a single bolt, i.e. bolt 120. Similarly, conversion from the mulching mode to side discharge mode is accomplished by replacing the closure member 92 with the discharge chute 130. Here again, this involves unfastening and reconnection of a single bolt 97. Conversion between side discharge and rear collection involves loosing and reconnection of bolts 97 and 120. Thus modifying the cutter assembly from any one mode to another involves, at most, two bolts, and in some cases only a single bolt. This permits these changes to be made in a minimum of time, in contrast to prior art mowers which required the attachment and/or replacement of many parts, and in some cases the whole cutter deck.

The combination of the internal baffling and the blower assembly 32 produces an air flow pattern that moves clippings to the desired location in all three modes with a minimum of baffle changes. Moreover, the manner in which the baffles 90, 91 and 105 and the closure member 92 and chute 130 are mounted permits rapid changes.

FIGS. 7 and 8 show an alternate embodiment of the invention wherein the chute 130' is mounted on the cutter top deck 56 by means of a discharge guard 142. Discharge guard 142 includes a mounting plate 143 and a front baffle 144 which is fixed to the front side of the mounting plate 143 and extends downwardly therefrom. The side edge of the mounting plate 142 is generally arcuate and conforms to the configuration of the edge of the top deck 56.

The discharge guard 142 is mounted on the deck 20 by means of an extension 146 of baffle 144 which has a hole 148 for receiving bolt 97. In addition, the discharge guard 142 is secured by a retainer 149 which extends through a keyhole slot 150 formed in the mounting plate 143 as shown in FIGS. 7 and 8. The retainer 149 includes a spacer comprising a stem portion 156 and a flange portion 158 having a diameter greater than that of the stem portion 156. A bolt 160 extends through a central bore 161 in retainer 149 and through an opening 162 formed in the top deck 56. The lower end of bolt 160 is secured by a nut 164.

The discharge guard 142 is mounted on the top deck 56 by placing the large end of keyhole slot 150 over the flange portion 158 of the retainer 149. The discharge guard 142 is then slid to the upper right as viewed in FIG. 7 to move the small end of the key hole slot beneath the flange portion 158. The bolt 97 is then tightened to secure the mounting plate 143 in the same manner as the closure member 92.

The chute 130' is pivotally mounted on the discharge guard 142 by means of a hinge assembly 166. In particular, the hinge assembly 166 includes a support member 167 fixed to the upper surface of the plate 143 for supporting a first pair of upwardly extending, parallel, spaced apart hinge members 168. In addition, the chute 130' has a complimentary pair of parallel hinge members 170 which are spaced apart a distance equal to that between the hinge members 168 so that each hinge member 168 is adjacent one of the hinge members 170 to provide spaced apart hinged pairs. Each of the hinge members 168 and 170 is suitably apertured for receiving a hinge bolt 172 through each hinge pair. The bolts 172 are secured by nuts 174 to pivotally secure the chute 130' to the deck guide 142.

Also mounted on the chute 130' is a biasing means 175 for biasing the chute 130' toward a generally horizontal position. In the illustrated embodiment, the biasing means 175 comprises a biasing spring 176 mounted between a pair of supports 178 secured to the top plate 132'. A bolt 180 extending through suitable apertures in the supports 178 and through the spring 176 and a nut, not shown, contains the spring between the supports 178. One end of spring 176 engages the upper surface of the chute 130' and the other end thereof engages the support member 167 to bias the chute 130' downwardly.

By pivotally mounting the chute 130' on the cutter deck 20, the overall width of the mower can be reduced to enhance maneuverablitily and to permit cutting closer to structures such as trees, walls, fences, and shrubbery. Once the chute 130' is mounted on the discharge guard 142, the two may be removed from or mounted on the mower as a unit.

While only a few embodiments of the invention have been illustrated and described, it is not intended to be limited thereby but only by the scope of the appended claims.

We claim:

1. A lawn mower including;
   a power source,
   a cutter assembly including a cutter deck having a top portion and a skirt portion depending from the top portion, the cutter deck defining a front, a rear and first and second sides and at least three cutting zones, and at least three cutter blades mounted in the cutter deck for rotation about generally parallel rotation axes, one of said cutter blades being disposed in each of the cutting zones,
   a power transmission assembly coupled to the power source and the cutter blades for rotating the cutter blades about the rotation axes,
   the first cutting zone being located at one side of the cutter deck, the second cutting zone being located at the other side of the cutter deck and the third cutting zone being located between the first and second cutting zones,
   a first opening formed in the skirt portion adjacent the second cutting zone,
   a closure member removably mounted on the skirt portion over the first opening and being configured to close the first opening,
   a hopper for collecting grass clippings,
   a second opening formed in the skirt portion defining the second cutting zone and spaced from the first opening toward the rear of the cutter deck, a conduit coupled at one end to the second opening and at its other end to the hopper for conducting grass clippings from the cutter deck to the hopper,
   a first baffle defining a portion of the first cutting zone, a second baffle defining a portion of the second cutting zone, a third baffle defining a portion of third cutting zone, a fourth baffle extending between the third cutting zone and the second cutting zone for directing clippings from the third cutting zone to the second cutting zone, and a fifth baffle removably mounted in the second cutting zone between the first and second openings and spaced from the rear of the cutter deck for directing clippings in the second cutting zone toward the second opening,
   the second baffle being positioned over the second opening and being removable to communicate the conduit with the second cutting zone, whereby clippings from said first, second and third cutting zones are discharged from the first opening when the closure member is removed and the second baffle is positioned over the second opening, and whereby clippings are mulched when the closure member is mounted over the first opening and the second baffle is positioned over the second opening, and whereby clippings are delivered to the hopper when the closure member is mounted over the first opening, the fifth baffle is mounted in the second cutting zone, and the second baffle is removed from the second opening.

2. The lawn mower set forth in claim 1 and including first and second mounting members configured to releasably mount the closure member on the cutter deck and over the first opening, and a side discharge chute releasably engageable with the first and second mounting members for being removably mounted adjacent the first opening after the closure member has been removed.

3. The lawn mower set forth in claim 1 and including a mounting member configured to mount the second baffle on the cutter deck, the fifth baffle being releasably engageable with the mounting member to mount the fifth baffle on the cutter deck when the second baffle is removed.

4. The lawn mower set forth in claim 1 wherein the third cutting zone is disposed forwardly of the first and second cutting zones and the length of the cutter blades being sufficiently long to provide overlapping cutting swaths by said first, second and third cutter blades without the ends of the cutter blades overlapping.

5. The lawn mower set forth in claim 1 wherein the power transmission comprises a belt and pulleys for coupling the cutter blades to the power source so that the blades can slip if a heavy or movable object is engaged without damage to the power transmission.

6. The lawn mower set forth in claim 1 and including a blower connected in said conduit between said cutter assembly and said hopper for drawing clippings from said cutter assembly through said second opening and discharging the clippings to said hopper.

7. The lawn mower set forth in claim 1 wherein the first, second and third baffles are arcuate and disposed adjacent the rear of the cutter deck, the third baffle being disposed between the first and second baffles, and the fourth baffle being generally linear and disposed adjacent the front of the cutter deck.

8. The lawn mower set forth in claim 7 including first and second mounting members configured to mount the closure member on the cutter deck and over the first opening, a side discharge chute releasably engageable with the first and second mounting members for being removably mounted over the first opening after the closure member has been removed.

9. The lawn mower set forth in claim 8 and including a third mounting member configured to mount the second baffle on the cutter deck, said fifth baffle being releasably engageable with the third mounting member to mount the fifth baffle on the cutter deck when the second baffle is removed.

10. The lawn mower set forth in claim 9 wherein the third cutting zone is disposed forwardly of the first and second cutting zones and the length of the cutter blades being sufficiently long to provide overlapping cutting swaths by said first, second and third cutter blades without the ends of the cutter blades overlapping.

11. The lawn mower set forth in claim 10 wherein the power transmission comprises a belt and pulleys for coupling the cutter blades to the power source so that the blades can slip if a heavy or movable object is engaged without damage to the power transmission.

12. The lawn mower set forth in claim 11 and including a blower connected in said conduit between said cutter assembly and said hopper for drawing clippings from the cutter assembly through said second opening and discharging the clippings to said hopper.

13. A lawn mower including;
   a power source,
   a cutter assembly including a cutter deck having a top portion and a skirt portion depending from the top portion, the cutter deck defining a front, a rear and first and second sides and at least three cutting zones, and at least three cutter blades mounted in the cutter deck for rotation about generally parallel rotation axes, one of said cutter blades being disposed in each of the cutting zones,
   a power transmission assembly coupled to the power source and the cutter blades for rotating the cutter blades about the rotation axes,
   the first cutting zone being located at one side of the cutter deck, the second cutting zone being located at the other side of the cutter deck and the third cutting zone being located between the first and second cutting zones,
   a first opening formed in the skirt portion adjacent the second cutting zone,
   first mounting means adjacent the first openings,
   a first removable member configured to close the first opening and releasably engageable with the first mounting means for being positioned over the first opening,
   a plurality of baffles defining portions of the first, second and third cutting zones; said baffles being configured to direct clippings from the first cutting zone to the third cutting zone and from the third cutting zone to the second cutting zone,
   a hopper for collecting grass clippings,
   a second opening formed in the skirt portion defining the second cutting zone and spaced from the first opening, a conduit coupled at one end to the second opening and at its other end to the hopper for conducting grass clippings from the cutter deck to the hopper,
   second mounting means adjacent the second opening,
   an additional baffle releasably engageable with the second mounting means to mount the additional baffle on the cutter deck, the additional baffle being constructed and arranged to direct clippings in the second cutting zone toward the second opening,
   a second removable member alternatively engageable with the second mounting means and constructed and arranged to be mounted over the second opening and being removable from the second mounting means to communicate the conduit with the second cutting zone, whereby clippings from said first, second and third cutting zones are discharged from the first opening when the first removable member is removed and the second removable member is in position over the second opening, and whereby the clippings are mulched when the first and second removable members are mounted over the first and second openings, and whereby clippings are delivered to the hopper when the first removable member is mounted over the first opening, the second removable member is removed, and the additional baffle is mounted in the second cutting zone.

14. The lawn mower set forth in claim 13 and including a side discharge chute releasably engageable with the first mounting means when the first removable member is removed.

15. The lawn mower set forth in claim 14 wherein the first mounting means comprises first and second mounting members configured to mount either the first removable member or the side discharge chute on the cutter deck and over the first opening.

16. The lawn mower set forth in claim 15 wherein the second mounting means comprises a third mounting member configured to mount the second removable member on the cutter deck, or alteratively, to mount the additional baffle on the cutter deck when the second removable member is removed.

17. The lawn mower set forth in claim 16 wherein the plurality of baffles comprises first, second and third arcuate baffles, and a fourth generally linear baffle disposed adjacent the front of the cutter deck.

18. The lawn mower set forth in claim 17 wherein the third cutting zone is disposed forwardly of the first and second cutting zones and the length of the cutter blades being sufficiently long to provide overlapping cutting swaths by said first, second and third cutter blades without the ends of the cutter blades overlapping.

19. The lawn mower set forth in claim 18 wherein the power transmission comprises a belt and pulleys for coupling the cutter blades to the power source so that the blades can slip if a heavy or movable object is engaged without damage to the power transmission.

20. The lawn mower set forth in claim 19 and including a blower connected in said conduit between said cutter assembly and said hopper for drawing clippings from said cutter assembly through said second opening and discharging said clippings to said hopper.

21. A lawn mower including:
   a power source,
   a cutter assembly including a cutter deck having a top portion and a skirt portion depending from the top portion, the cutter deck defining a front, a rear and first and second sides and first, second and third cutting zones, the first cutting zone being located at the first side of the cutter deck, the second cutting zone being located at the second side of the cutter deck and the third cutting zone being located between the first and second cutting zones, a plurality of cutter blades mounted in the cutter deck for rotation about generally parallel rotation axes, one of said cutter blades being disposed in each of the cutting zones,
   a power transmission assembly coupled to the power source and the cutter blades for rotating the cutter blades about the rotation axes,
   an opening formed in the skirt portion adjacent the second cutting zone to permit side discharge,
   first and second mounting members adjacent the opening,
   a first removable member configured to close the opening and releasably engageable with the first and second mounting members for being positioned over and removed from the opening,
   a plurality of baffles defining portions of the cutting zones and being configured to direct clippings from the first cutting zone to the third cutting zone and from the third cutting zone to the second cutting zone,
   a third mounting member, a second removable member releasably engageable with the first and third mounting members,
   a side discharge chute releasably mountable on the second removable member and pivotable about a generally horizontal axis when the first removable member is removed, a hopper for collecting grass clippings, a second opening formed in the skirt portion defining the second cutting zone and spaced from the first opening toward the rear of the cutter deck, a conduit coupled at one end to the second opening and at its other end to the hopper for conducting grass clippings from the cutter deck to the hopper, and a first removable baffle positioned over the second opening and being removable to communicate the conduit with the second cutting zone, whereby clippings from said first, second and third cutting zones are discharged from the first opening when the first removable member is removed and whereby clippings are mulched when the first removable member is mounted over the first opening, and whereby clippings are delivered to the hopper when the first removable member is mounted over the first opening and the first removable baffle is removed from the second opening;

wherein one of said plurality of baffles is removably mounted in the second cutting zone between the first and second openings and spaced from the rear of the cutter deck for directing clippings in the second cutting zone toward the second opening.

22. The lawn mower set forth in claim 21 and including a blower connected in said conduit between said cutter assembly and said hopper for drawing clippings from said cutter assembly through said second opening and discharging the clippings to said hopper.

* * * * *